United States Patent [19]

Belliveau

[11] Patent Number: 5,280,837
[45] Date of Patent: Jan. 25, 1994

[54] DOOR FOR AN IMPROVED SEPARATION DEVICE

[75] Inventor: Phillip L. Belliveau, Rochester, N.H.

[73] Assignee: Davidson Textron Inc., Dover, N.H.

[21] Appl. No.: 962,687

[22] Filed: Oct. 19, 1992

[51] Int. Cl.$^5$ .............................................. B03B 4/00
[52] U.S. Cl. ...................................... 209/466; 209/20;
209/493; 209/495
[58] Field of Search ................ 209/20, 466, 471, 484,
209/485, 488, 490, 493, 494, 495

[56] References Cited

U.S. PATENT DOCUMENTS

| | | | |
|---|---|---|---|
| 2,007,098 | 7/1935 | Peale, Jr. | 209/466 X |
| 2,513,960 | 7/1950 | Ore | 209/495 X |
| 3,539,001 | 11/1970 | Binnix et al. | 209/495 X |
| 4,836,926 | 6/1989 | Grobler | 209/493 X |
| 5,042,725 | 8/1991 | Grimmer . | |

FOREIGN PATENT DOCUMENTS 0100866 7/1916 United Kingdom ................ 209/495

Primary Examiner—D. Glenn Dayoan
Assistant Examiner—Tuan N. Nguyen
Attorney, Agent, or Firm—Reising, Ethington, Barnard, Perry & Milton

[57] ABSTRACT

A door (20) for a separation table (10) is pivotably installed within discharge chute (12). The door is pivotable between a closed position and an open position. The door has a distal planar section (24) that lies horizontally against the floor wall (38) of the discharge chute when in a closed position. The door when in the open position has a curved contour section (26) that defines the lowest extent (47) of the door and upper wall of opening (47). A stop limit mechanism (50) includes a bar 52 that is adjustably mounted within discharge chute (12) to limit the opening of the door (20).

7 Claims, 2 Drawing Sheets

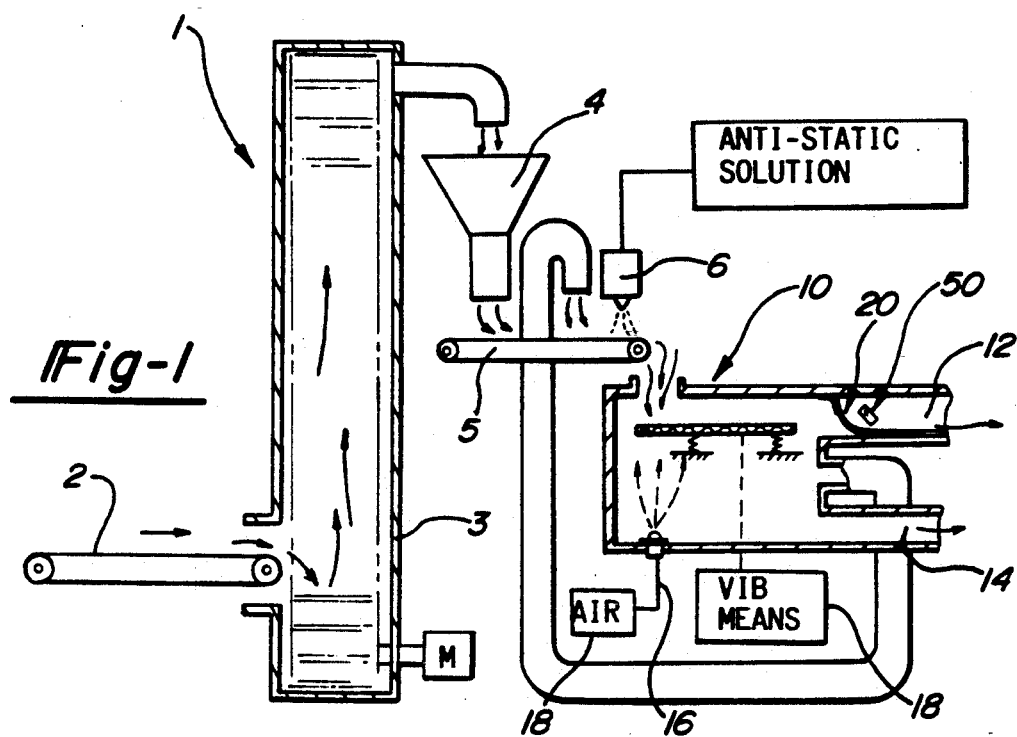
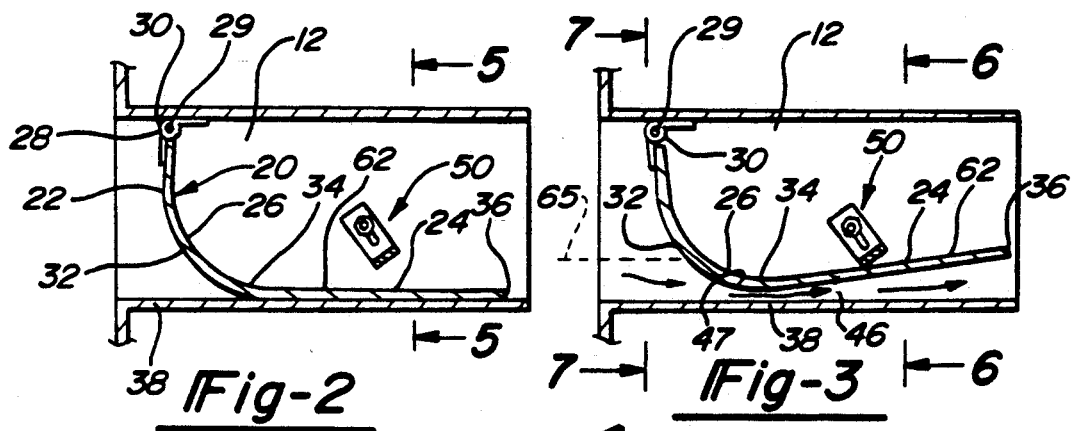
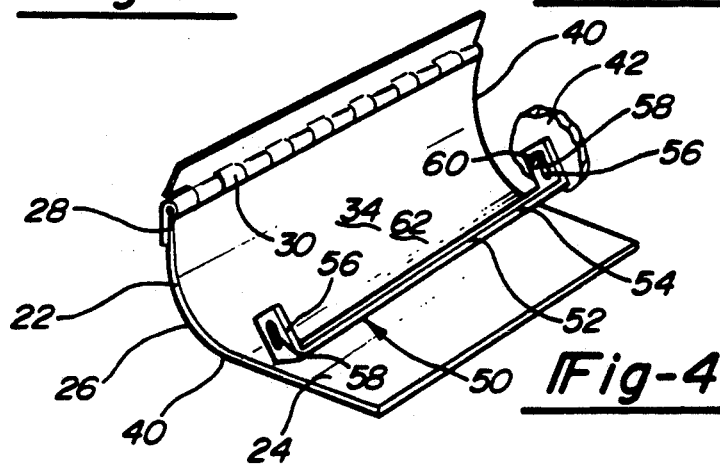

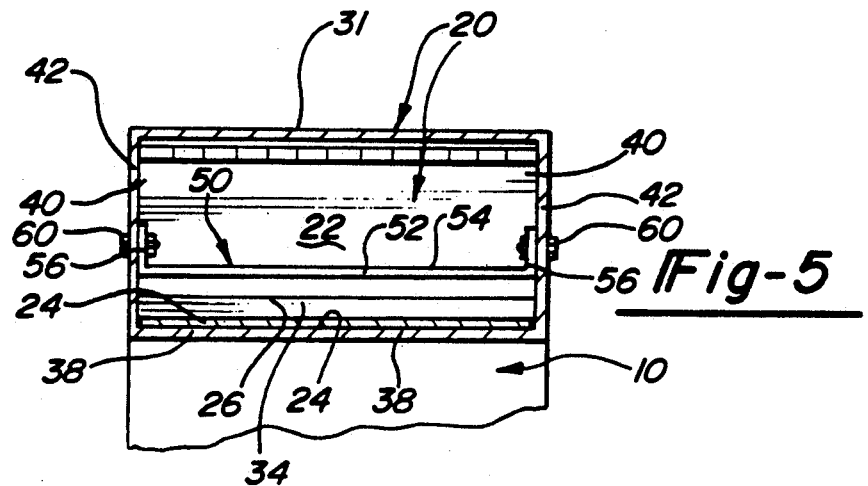
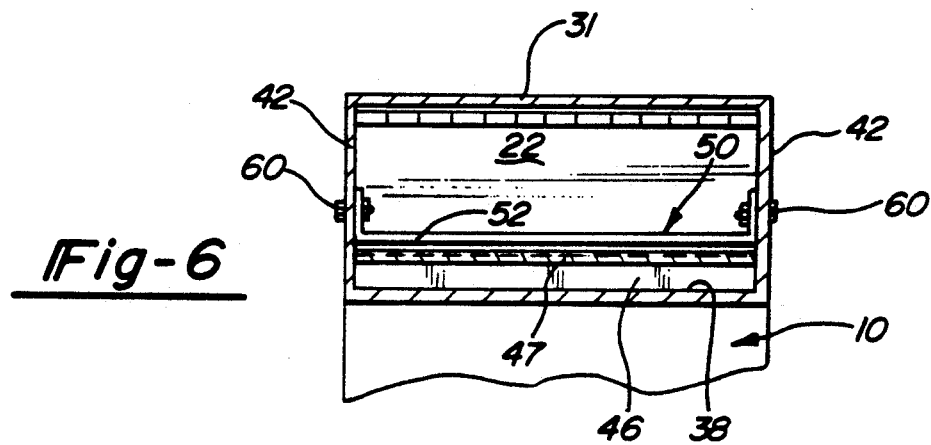
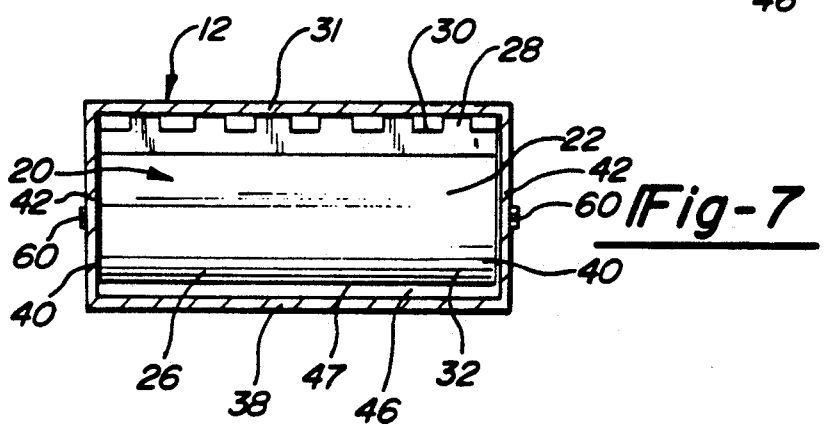

DOOR FOR AN IMPROVED SEPARATION DEVICE

TECHNICAL FIELD

The field of this invention relates to a method for recycling plastic parts and more particularly to recycling the constituent plastics of composite plastic parts.

BACKGROUND OF THE DISCLOSURE

Recycling waste trim is becoming more economically feasible due to the increasing value of the waste material, the increasing costs of solid waste disposal, and the decreasing availability of landfills. Many plastic articles are composite in nature. Articles, for example, automotive instrument panels may have a shell of harder denser plastic material, for example polyvinyl chloride (PVC), and a backing made from a less dense foam material such as urethane. After formation of the article, the article is trimmed or cut into its final shape. Excess trim results from each article. It has been proposed to recycle the excess trim and reclaim the component plastic materials.

Reclaiming plastic materials have difficulties not found for other types of materials. Plastic material is not magnetic, therefor, the use of magnetic fields often used in the reclamation of ferrous materials is useless. It has been proposed to recycle the material of the composite plastic by chopping the composite plastic into smaller fragments and sorting the fragments by the type of plastic. Liquid float tanks have been proposed where less dense foam particles float and dense vinyl particles sink. This method requires de-watering of the particles and subsequent drying which adds to the recycling costs. Furthermore many plastics have a density near that of water and thus the liquid float tanks do not adequately sort out these types of plastic materials.

Another process is disclosed in U.S. Pat. No. 5,042,725 issued to Robert A. Grimmer on Aug. 27, 1991. The Grimmer patent discloses a process for separating urethane foam and PVC particles from composite plastic parts by granulation of the composite parts to constituent foam and PVC particles. Larger particles are then separated from smaller particles by a screen. After the particles are sized, the foam and PVC particles are then separated by passing them through a separation table. The table uses air flow to levitate the less dense foam particles and allows the PVC particles to be at a lower level. The table is vibrated to direct the foam and PVC particles to different ducts.

The separation table described in the Grimmer patent has been utilized with flap doors at the duct for the discharge of the denser particles. The flap doors are aligned adjacent each other along the width of the duct and each is hinged at its top edge. Each flap door can independently swing to let the denser plastic material be discharged thereunder. However, some particles of less dense material are discharged between the openings created between the adjacent flap doors. Secondly, the flap doors may be prone to excess opening thereby allowing the less dense material to be discharged under the flap doors and contaminating the reclaimed PVC.

It has been found that the presence of only a small percentage of foam in the reclaimed PVC is enough to contaminate the reclaimed material such that it becomes unacceptable for known subsequent manufacturing processes. Furthermore only a small percentage of contamination is enough to render the reclaimed foam useless for further processing.

What is needed is an expediate reclamation process for composite urethane foam and PVC plastic parts that produces sufficiently pure reclaimed PVC and foam for subsequent known recycling processes.

SUMMARY OF THE DISCLOSURE

In accordance with one aspect of the invention, a separation table for separating particles based on density differences by use of gaseous flow has a first discharge chute positioned for denser particles to exit from said table and a second discharge chute positioned for less dense particles to exit from said table. The improvement includes a door mounted within the first discharge chute. The door is mounted for pivotable movement about a horizontal axis in proximity to a top edge of the door between a closed positioned which substantially closes off the first chute and an open position which opens up a lower portion of the chute. The horizontal axis is in proximity to a top side of the chute.

A stop mechanism limits pivotable motion of the door toward an open position. The door creates an opening that has its upper extent positioned below the lowest vertical level that the less dens particles float in the separation table.

Preferably, the stop means includes a rigid strip or bar extending between the side walls of the chute and being adjustably mounted to the side walls. The door and strip are positioned such that a back surface of the door abuts against the strip when in a full open position. Preferably, the rigid strip has distal ends bent approximately perpendicular to a middle section of the strip. The distal ends have slots therethrough to receive a threaded fastener therethrough that also extends through apertures in respective side walls of the chute such that the strip is adjustably affixed within the chute.

The door has a substantially planar distal end that includes more than one-half the surface area of the door. The top edge of the door includes a planar section that is substantially perpendicular to the distal planar end. A contoured mid-section is interposed between the perpendicularly disposed distal planar end and the top planar section. The door when in the closed position has the distal end being horizontally positioned and lying against the floor wall of the chute. The door may be pivoted such that the planar distal end surface may slightly point upwardly such that the low point of the door when the door is in an open position is at the contoured mid-section.

BRIEF DESCRIPTION OF THE DRAWINGS

Reference now is made to the accompanying drawings in which:

FIG. 1 is a diagrammatic view of a density separation apparatus incorporating a door in a separation table in accordance with one embodiment of the invention;

FIG. 2 is an enlarged side elevation and segmented view of the door and chute shown in FIG. 1;

FIG. 3 is a fragmentary view similar to FIG. 2 showing the door in a full open position;

FIG. 4 is a fragmentary perspective view of the door and stop bar shown in FIG. 1.

FIG. 5 is a cross-sectional view taken along lines 5—5 shown in FIG. 2;

FIG. 6 is a cross-sectional view taken along lines 6—6 shown in FIG. 3; and

FIG. 7 is a cross-sectional view taken along lines 7—7 shown in FIG. 3.

DETAILED DESCRIPTION OF THE PREFERRED EMBODIMENT

Referring now to FIG. 1, a separation apparatus 1 includes a feed conveyor 2 that receives granulated bits of mixed foam and PVC material particles. The granulation and reclamation process is described in U.S. Pat. No. 5,042,725 issued to Robert A. Grimmer on Aug. 27, 1991 which is incorporated herein by reference. The feed conveyor 2 feeds the mixed material to a vertical lift bucket conveyor 3, and an over head supply hopper 4. The material is discharged from the hopper 4 and fed across conveyor 5 into a density separation table 10 as schematically shown in FIG. 1. A destaticizer 6 sprays a suitable agent on the mixed vinyl and urethane particles as they pass over the conveyor 5.

The table 10 has a first discharge chute 12 and a second discharge chute 14. The first discharge chute 12 is positioned at the table 10 to discharged the denser polyvinyl chloride particles. The second discharge chute 14 is positioned at the table 10 to discharged the less dense urethane foam particles. The known separation table 10 has appropriate air flow ducts 16 with blowers and vacuum sources generally referred to as gaseous flow and vibration devices 18. The gaseous flow and vibration devices 18 are used to separate the denser PVC from the lighter urethane foam particles. The PVC particles flow out of discharge chute 12. The urethane foam particles a blocked by door 20 from entering discharged chute 12 and are directed to chute 14 where they are discharged.

As shown in FIGS. 2 and 3, the door 20 is pivotably mounted within chute 12 for movement between a closed position and open position. The door has a top planar section 22, a distal planar bottom section 24 and a contoured mid-section 26 interposed therebetween. The top planar section has a top edge 28 that is connected to hinge 30 adjacent the top wall 31 of the chute 12 for pivotable movement with respect to the chute 12 about a horizontal pivot axis 29.

When the door is in its closed position as shown in FIGS. 2 and 5, the door has its distal planar section 24 lie against floor surface 38 of chute 12. The side edges 40 of door 20 are adjacent side walls 42 of chute 12. The top edge 28 is adjacent the top wall 44 of chute 12. The door 20 is sized to substantially close chute 12. The door 20 is positioned such that the convex front surface 32 faces upstream toward table 10 and the concave rear surface 34 faces downstream within chute 12.

As the door 20 is moved toward its open position as shown in FIGS. 3, 6 and 7, the distal planar section 24 lifts away from bottom surface 38 to form an opening 46 therebetween. The planar section 24 is canted upwardly toward its distal edge 36. The opening 46 allows the denser and lower positioned polyvinyl chloride particles to pass therethrough into chute 12.

A stop limit mechanism is generally indicated at 50 as shown in FIGS. 3, 4, 6, and 7 to provide a stop beyond which the door 20 is unable to further open The stop limit 50 includes a rigid bar or strip 52 with a mid-section 54 that spans the width of chute 12 and two angled ends 56 as clearly shown in FIG. 4 that are bent substantially perpendicular with respect to the mid-section 54. Each end 56 has a slot 58 therethrough. The ends 56 are fastened to a respective side wall 42 of chute 12 via a threaded fastener and nut assembly 60. Slots 58 allow for limited adjustment of the bar 52 within chute 12 to provide for an adjustable full open position of the door 20. The bar 52 is positioned at the downstream side of door 20 and abuts the rear surface 62 of distal planar end 24.

In operation, the bar 52 is adjusted in position to provide that the door opens only to a full open position that is situated below the level 65 where urethane foam floats within the table 10 and schematically indicated in FIG. 3. The pressure exerted by the PVC and urethane foam particles within table 10 opens the door 20 to the open position as shown in FIGS. 3, 6, and 7. In this position, the PVC particles are free to continue through the formed opening 46 between the floor 38 and the low point 47 of the intermediate curved section 26 and through the remainder of chute 12. The lighter urethane foam particles are blocked by the convex front surface 32, and planar top section 22 whereby the vibration of the table 10 and the gaseous currents at the table 10 eventually redirect the foam to the second discharge chute 14.

The use of a one piece contoured door that opens a predetermined amount has been shown to greatly reduce contamination of the pvc with lighter urethane foam particles by over 50%. Previous average amounts of contamination have been at 1.991% levels of urethane foam particles by weight. The use of a door 20 according to the above description has been able to reduce the contamination percentage of urethane foam in the PVC passing through the chute 12 to an average of 0.916%.

Variations and modifications are possible without departing from the scope and spirit of the present invention as defined by the appended claims.

The embodiments in which an exclusive property or privilege is claimed are defined as follows:

1. In a table apparatus for separating particles based on density differences by use of gaseous flow for creating movement of said particles, a vibration device for separating said particles, said table having a first discharge chute positioned for denser particles to exit from said table and a second discharge chute positioned for less dense particles to exit from said table; the improvement characterized by;

a door mounted within said first discharge chute, said door mounted for pivotable movement about a horizontal axis in proximity to a top edge of said door between a closed positioned which substantially closes off said first chute and an open position which opens up a lower portion of said chute, said horizontal axis being in proximity to a top side of said chute;

a bottom section of said door being adjacent a bottom surface of said chute when said door is in a closed position;

stop means including opposing abutment surfaces on said door and said chute for limiting pivotable motion of said door to define an opening adjacent the floor of said chute when said door bottom section upwardly moves;

an upper edge of said opening being below a lowest vertical level that said less dense particles float within said bed table by said gaseous flow;

said stop means including a rigid strip extending between the side surfaces of the chute and being adjustable mounted to the side surfaces; and said door and strip being positioned such that a back surface of said door abuts against said strip when in a full open position.

2. In a table apparatus as defined in claim 1 further characterized by;

said rigid strip having distal ends bent approximately perpendicular to a middle section of said strip;

said distal ends having aligned slots therethrough to receive a threaded fastener therethrough that also extends through a respective side surfaces of said chute such that said strip is adjustable affixed within said chute.

3. In a table apparatus for separating particles based on density differences by use of gaseous flow for creating movement of said particles, a vibration device for separating said particles, said table having a first discharge chute positioned for denser particles to exit from said table and a second discharge chute positioned for less dense particles to exit from said table; the improvement characterized by;

a door mounted within said first discharged chute, said door mounted for pivotable movement about a horizontal axis in proximity to a top edge of said door between a closed positioned which substantially closes off said first chute and an open position which opens up a lower portion of said chute, said horizontal axis being in proximity to a top side of said chute;

a bottom section of said door being adjacent a bottom surface of said chute when said door is in a closed position;

stop means including opposing abutment surfaces on said door and said chute for limiting pivotable motion of said door to define an opening adjacent the floor of said chute when said door bottom section upwardly moves;

an upper edge of said opening being below a lowest vertical level that said less dense particles float within said bed table by said gaseous flow; and said door having a curved contour from the door top edge to the door bottom edge such that the door surface near the top edge is approximately perpendicular to the bottom section of said door.

4. In a table apparatus as defined in claim 3 further characterized by;

said door having a substantially planar distal end that includes more than one-half the surface area of said door;

said top edge of said door includes a planar section that is substantially perpendicular to said distal planar end; and a contoured mid-section is interposed between said distal planar end and said planar section.

5. In a table apparatus as defined in claim 4 further characterized by;

said door being mounted in said chute such that said distal planar end section lies adjacent a floor wall of said chute when in the closed position; and said door being movable to an open position whereby the lowest point of said door is at said contoured mid-section which is spaced above said floor wall of said chute to form an opening where denser particles may pass therethrough.

6. In a table bed as defined in claim 5 further characterized by;

said stop means including a rigid strip extending between the side surfaces of the chute and being adjustably mounted to the side surfaces; and said door and strip being positioned such that a back surface of said distal planar end of said door abuts against said strip when in a full open position.

7. In a table bed as defined in claim 4 further characterized by;

said stop means including a rigid strip extending between the side surfaces of the chute and being adjustably mounted to the side surfaces; and said door and strip being positioned such that a back surface of said distal planar end of said door abuts against said strip when in a full open position.

* * * * *